May 12, 1964 M. CAMRAS 3,133,150

MAGNETIC RECORD FOR VIDEO SIGNALS

Original Filed April 11, 1952 4 Sheets-Sheet 1

INVENTOR
Marvin Camras
BY Hill, Sherman, Meroni, Gross & Simpson
ATTORNEY

INVENTOR

Marvin Camras

BY Hill, Sherman, Meroni, Gross & Simpson

ATTORNEY

MAGNETIC RECORD FOR VIDEO SIGNALS

Original Filed April 11, 1952 4 Sheets-Sheet 3

INVENTOR

Marvin Camras

BY Hill, Sherman, Meroni, Gross & Simpson

ATTORNEY

MAGNETIC RECORD FOR VIDEO SIGNALS

Original Filed April 11, 1952 4 Sheets-Sheet 4

INVENTOR
Marvin Camras
BY Hill, Sherman, Meroni, Gross & Simpson
ATTORNEY 3,133,150

MAGNETIC RECORD FOR VIDEO SIGNALS

Marvin Camras, Glencoe, Ill., assignor to IIT Research Institute, a corporation of Illinois Original application Apr. 11, 1952, Ser. No. 281,939, now Patent No. 2,900,443, dated Aug. 18, 1959. Divided and this application Aug. 10, 1959, Ser. No. 832,848
3 Claims. (Cl. 178—6.6)

This invention relates to the reproduction of magnetically recorded signals and particularly to the reproduction of video signals generated by moving visual images.

One of the principal features and objects of the present invention is the provision of a method and means for reproducing a recorded video signal such as a television signal.

Another object of the present invention is to provide a novel method and means for translating a magnetic signal into an electrical signal.

A further object of the present invention is to provide a novel magnetic reproducer head and a novel magnetized record for reproduction by said head.

Other objects and features which we believe to be characteristic of our invention are set forth with particularity in the appended claims. Our invention itself, however, both as to its organization, manner of construction, and method of operation, together with further advantages and objects thereof, may be best understood by reference to the following description taken in connection with the accompanying drawings, in which:

Figure 1:
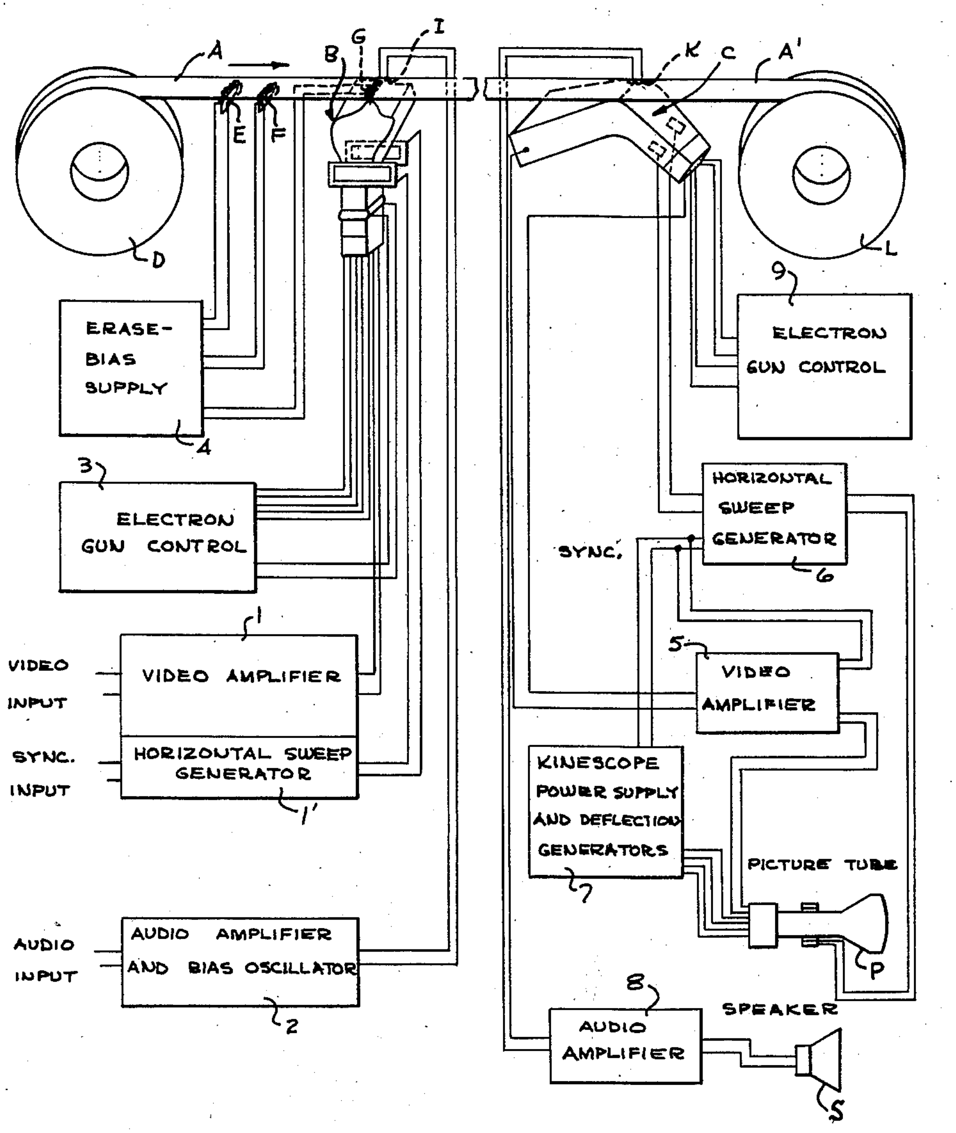
FIGURE 1 is a diagrammatic showing of a video recording system and a video reproducing system as they might be employed in recording and monitoring a video signal, and embodying the novel teachings and principles of the present invention.

In FIGURE 1 is illustrated the complete overall system of the present invention as it might be employed for example in recording a television program and contemporaneously reproducing the recording for purposes of monitoring. In such a case, the tape portions A, A′ passing respectively over a recording head B and reproducer head C could be part of the same tape. In any event, the tape portion A represents an elongated magnetizable medium which may be delivered at a substantially uniform rate from a supply reel D and may first travel over an erase head E, then possibly a polarizing head F, and thereafter may travel over bias head G and the video electromagnetic recording head B and preferably an audio electromagnetic recording head I. The tape portion A′ has a video signal and preferably an audio signal recorded thereon and is passed over the video electromagnetic reproducer or playback head C and an audio electromagnetic reproducer head K and is then wound on a take-up reel L at a substantially uniform rate. The video reproducer head C is shown in detail in FIGURES 9, 10 and 11, and will be specifically described hereinafter. The polarizing head F might be used in conjunction with a D.C. erase head E to depolarize the tape prior to recording thereon. The bias head G would likewise be used to aid in depolarizing the tape. If a high frequency erase head were used, the bias head would produce a high frequency bias field and the polarizing head F would not be used. The bias field could be produced by the recording head B as will hereinafter be described.

As indicated in FIGURE 1, the video signal to be recorded may be supplied to the video amplifier 1, for example from a television receiver, or from television program lines, and the horizontal sweep generator 1′ may receive a synchronizing signal from the same source. The audio input may be supplied from the discriminator stage of a receiver or from audio lines to the audio amplifier 2 for the audio recording head I. A bias ocillator 2 may supply the bias field to the head I instead of using a separate bias head. The electron gun control 3 is represented as supplying the recording tube filament, plate, and beam supply voltages as well as control voltages for focus, positioning, intensity and the like, while erase-bias supply 4 furnishes erasing, polarizing and bias voltages.

In the playback system, the video signal detected by reproducer head C is delivered to the video amplifier 5 and the amplified signal controls a conventional television picture tube P, for example. The video amplifier may be provided with a conventional D.C. restorer circuit if desired. The output from the video amplifier 5 may be used to synchronize the horizontal sweep generator 6 for the reproducer head C and the deflection generators of the kinescope supply 7 for the picture tube P, or in some cases, as for example if the video signal is being transmitted, a master sync. generator can be used to synchronize the sweep generator 6 and deflection generators of the picture tube. The audio signal on the tape A′ is detected by the audio reproducer head K and transmitted through audio amplifier 8 to the speaker S. The electron gun supply 9 is indicated as furnishing filament, plate and beam supply voltages for the playback tube C as well as control voltages for focus, positioning and the like.

Figure 2:
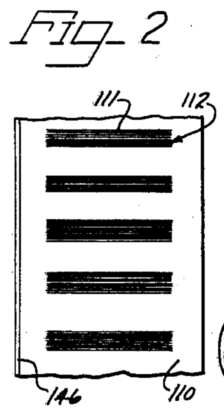
FIGURE 2 is a fragmentary diagrammatic plan view of a portion of a lengthy magnetizable medium magnetized in accordance with the novel teachings and principles of the present invention.

The manner in which magnetization is impressed on a tape 110 by the head B of FIGURE 1 is indicated diagrammatically in FIGURE 2. Each horizontal sweep of a scanning beam in the head B produces a transverse line 111 of magnetization on the tape. This line 111 corresponds to a line of the video signal. If the video signal comprises a moving visual image which is transmitted by scanning the image a number of times a second, a magnetic reproduction of that image will appear on the tape 110, though the image might be elongated laterally or longitudinally, and each complete scanning or frame of the moving image will have a magnetic counterpart in a frame 112 on the lengthy magnetizable medium 110. In fact, if magnetic particles were dusted on the film, an actual image corresponding to the image of the video signal would appear at each frame. The advantage of recording the video signal line for line and frame for frame in this manner is that in reproduction, the tape need not be scanned exactly line for line, but may be scanned between lines, or even longitudinally instead of transversely, that is the magnetic image need not be scanned in reproduction in the identical way in which it was recorded.

In order to facilitate scanning of the recorded magnetic image, it is desirable to have adjacent lines of the magnetic image overlap. Such overlapping can be accomplished, for example, by utilizing a transducer lamination in the head B of the thickness of 0.001 inch with the tape traveling at the rate of fifteen inches per second.

With double interlaced scanning, two "frames" make each picture, but the above cited advantages still hold, though not as perfectly as with a series of complete pictures. Where it is practical to do so, it is preferred to record complete rather than interlaced pictures. A record having complete pictures can be converted to the interlaced type, by offset heads, for example.

Figure 3:
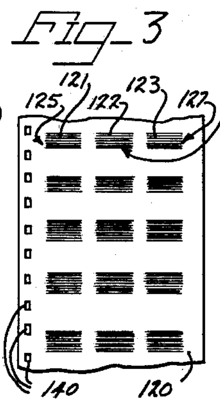
FIGURE 3 is a fragmentary diagrammatic showing of a lengthy magnetizable medium magnetized in a second manner.

FIGURE 3 illustrates a lengthy magnetizable medium 120 wherein three lines of a video signal 121, 122 and 123, for example, are located generally in the same transverse row across the tape. For the same size tape, this reduces the speed of scanning by a factor of three. Such a magnetic recording would be produced with the recording head of FIGURE 1, if the beam were moved across the target at one-third the scanning speed of the video signal being recorded. Each frame on the tape would then comprise three transversely aligned frame portions 125, 126 and 127. In this case, while each frame portion could be scanned separately to reproduce an image, such an image would not be satisfactory, since only one-third of the lines originally scanned are included in the image. A record of this type has the advantage of reduced scanning rate, by a factor depending on the number of columns. A slower scanning rate is important when the system contains mechanical elements, or where inductive reactances, transmit time, etc. are problems.

Figure 4:
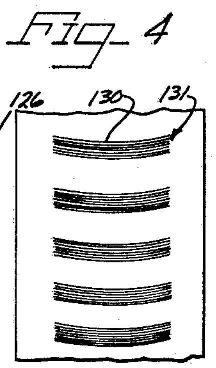
FIGURE 4 is a fragmentary diagrammatic plan view of a lengthy magnetizable medium magnetized in a third manner.

In FIGURE 4 is shown a record member similar to FIGURE 2 in having a single line of video signal across the width of the tape, but in which each magnetic line 130 on the tape is curved, as would be produced by the head B of FIGURE 1 if the transducer device were curved along its longitudinal axis. The frames 131 are spaced serially along the tape as in FIGURE 2. An arc shaped path gives a longer line for a given tape width. This type of pattern is also an advantage when used with certain mechanical scanners.

Figure 5:
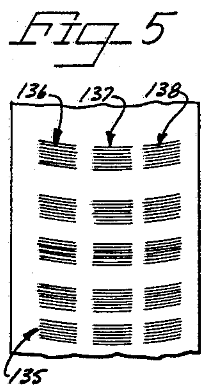
FIGURE 5 is a fragmentary diagrammatic plan view of a lengthy magnetizable medium magnetized in a fourth manner.

In FIGURE 5 each frame 135 comprises frame portions 136, 137 and 138 in an arcuate pattern across the tape.

Any one of the tapes illustrated in FIGURES 2 to 5 may be perforated at one edge as indicated at 140 in FIGURE 3 for synchronizing the speed of the tape with the video signal, or a synchronizing control may be actuated by pick-up from the magnetic frame pattern recorded on the tape; the control signals being amplified and used to correct for phase errors of the tape with respect to the pick-up head. An audio sound track may run along an edge of the tapes as indicated in FIGURE 2 at 146.

Figure 6:
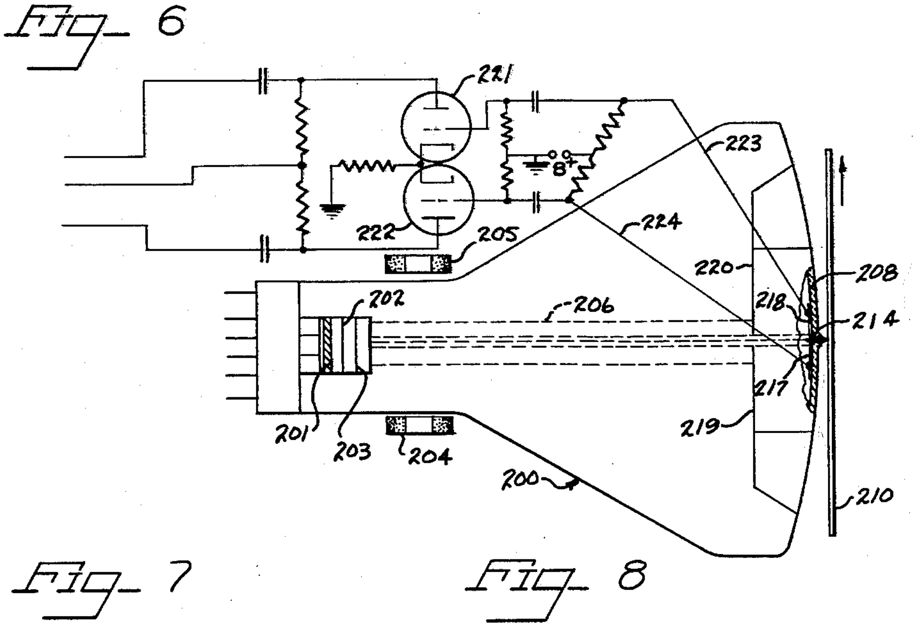
FIGURE 6 is a diagrammatic side view of an electromagnetic reproducer head embodying the novel teachings and principles of the present invention, and indicating an electric circuit for detecting the video signal produced by the head.
Figure 7:
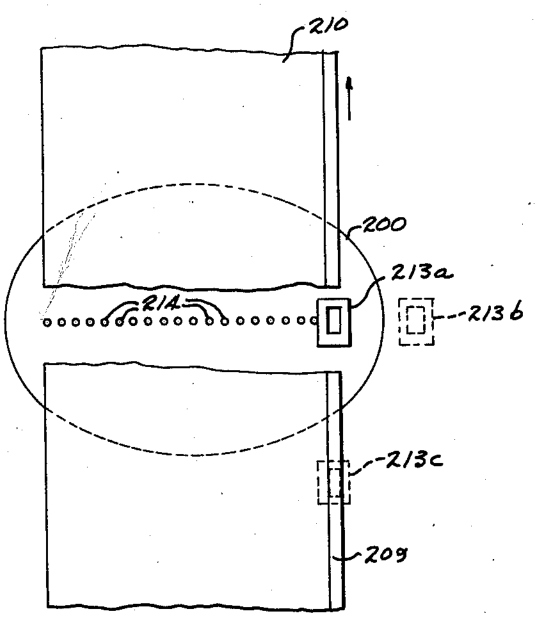
FIGURE 7 is an end elevational view of the reproducer head of FIGURE 6 looking from the right in FIGURE 6 and with a portion of the lengthy magnetizable medium broken away.
Figure 8:
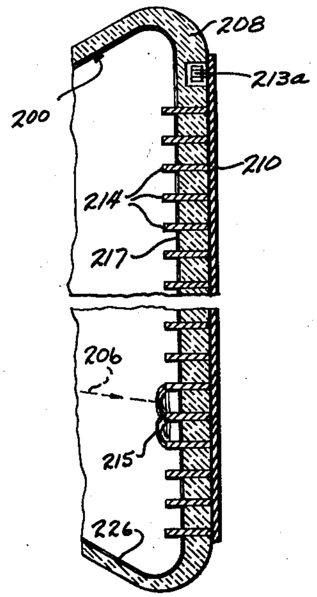
FIGURE 8 is a fragmentary horizontal sectional view of a reproducer head of FIGURE 6.

In FIGURES 6, 7 and 8 is illustrated an electromagnetic reproducer head according to the present invention. The head comprises a cathode ray tube 200 provided with an electrode assembly including an electron emitter 201 and accelerating and focusing electrodes such as 202 and 203 producing an electron beam 206 having considerable vertical extent as indicated in FIGURE 6. Such a beam will be termed a wide beam, wide referring to the vertical extent of the beam in the orientation of the tube illustrated. Horizontal deflection coils 204 and 205 are illustrated for sweeping the electron beam 206 back and forth across the tube end wall 208. A magnetic tape 210 having a video signal recorded on the magnetizable coating thereof is moved across the exterior of the end wall. The tape may also have an audio signal indicated at 209 recorded at one edge thereof for reproduction by a conventional head. A similar sound track is indicated at 146 in FIGURE 2. As indicated in FIGURES 7 and 8, the head is preferably disposed within the tube end wall 208 as indicated in solid outline at 213*a*, or it may be located to one side at 213*b*. It may also be located in advance of the head at 213*c*. With the audio head in line with the video head as shown in 213*a* or 213*b*, a record tape is made which can readily be edited because picture and sound correspond.

The magnetic signal recorded on the tape is utilized to deflect the wide electron beam 206. To this end a large number of high permeability wires 214 are embedded in the end wall 208 of the tube. These wires are indicated diagrammatically only in FIGURES 6 and 8. There may be, for example, 500 of them in a two inch tube wall, and they may be made of 4750 alloy, which has the same coefficient of expansion as glass and thus makes possible a good seal. As the tape passes the exterior ends of the wires, magnetic fields are set up through the wires which may extend as indicated as 215 in FIGURE 8. It will be observed that the fields extend generally in a horizontal plane between adjacent wires and generally at right angles to the beam. Thus the beam will be deflected either upwardly or downwardly depending on the polarity of the fields. Collector plates 217 and 218 are located above and below the wires to collect the deflected electrons. The baffle plates 219 and 220 accurately control the width of the electron beam reaching the region of the collector plates regardless of small variations that usually occur in cathode ray tubes, and the magnetic fields 215 alter the proportion of the electrons traveling to each of the collector plates 217 and 218.

As indicated in FIGURE 6, the output from collector plates 217 and 218 may be delivered to the grids of a pair of tubes 221 and 222 of the push-pull amplifier by means of conductors 223 and 224. The video output from the push-pull amplifier may be delivered to a video amplifier for further amplification. The elements at the face of the tube, and coatings on the sides of the tube indicated at 226 in FIGURE 8, are charged positive with respect to the electron gun, for focusing and acceleration. A low voltage beam is preferred because it allows greater sensitivity to deflection by the magnetic elements. Only one of the collector elements 219 or 220 may be used with a single ended video amplifier.

Figure 9:
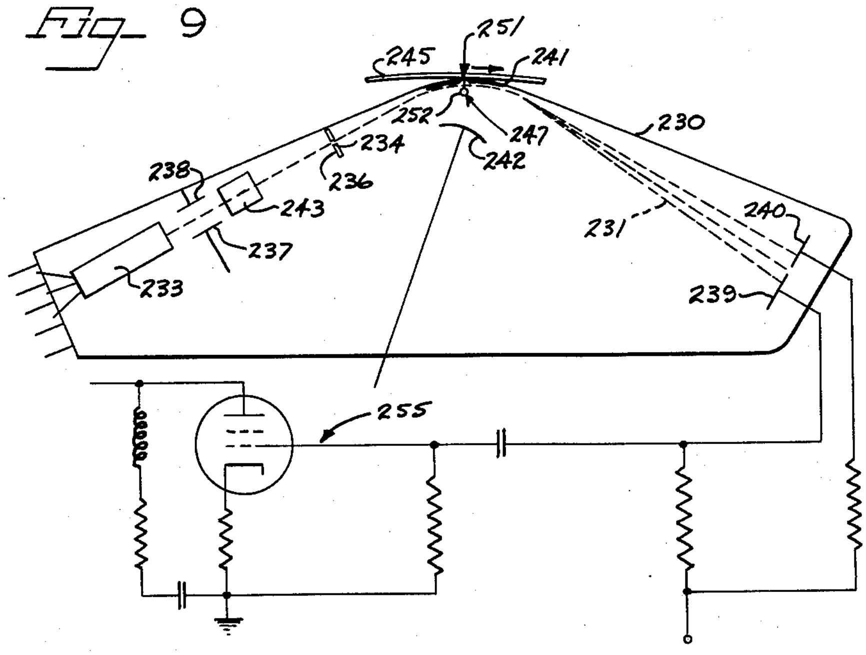
FIGURE 9 is a diagrammatic elevational view of a further form of electromagnetic reproducer head embodying the novel teachings and principles of the present invention.
Figure 11:
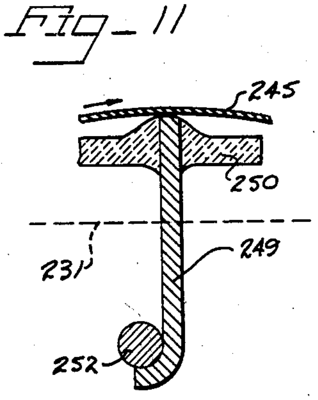
FIGURE 11 is a fragmentary cross-sectional view taken substantially along the line IX—IX of FIGURE 10.
Figure 10:
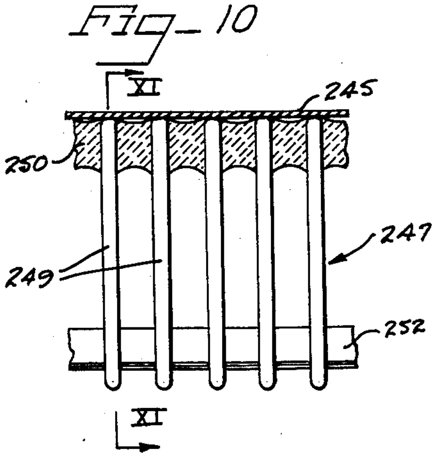
FIGURE 10 is a fragmentary front elevational view of the magnetic grid wire assembly of the head of FIGURE 9.

In FIGURES 9, 10 and 11 is illustrated a second embodiment of the electromagnetic reproducer head of the present invention. This head comprises a tube 230 providing a curved path for an electron beam 231. The beam is generated by an electron gun 233 and may be directed through an elongated slit 234 in a baffle plate 236 by means of vertical positioning plates 237 and 238 or by other suitable means. The beam is illustrated as being deflected downwardly to the target plates 239, 240 by means of electrostatic deflecting plates 241, 242, however magnetic deflection means could be used advantageously. The horizontal sweep plates 243 cause the beam to cyclically travel across the length of the target plates 239, 240 which act similarly to target plates 217 and 218 in FIGURE 6. The reproducer head of FIGURE 9 differs from that of FIGURE 6 in that the magnetic field of the record medium 245 is applied to the beam at a point remote from the target plates so that the effect of the field on the beam is amplified; that is, greater displacement of the beam at the target plates is obtained for a given applied magnetic field.

The magnetic field of the tape 245 is applied to the beam by means of a magnetic grid 247 extending across the path of the beam 231. As shown in FIGURES 10 and 11, this grid comprises a plurality of vertically extending members 249 of high permeability material which protrude through the tube wall 250 at the elbow 251 therein, FIGURE 9. The wires are sealed in the tube wall at the top and may project above the tube wall slightly as indicated in FIGURES 10 and 11 to receive the tape thereacross. The wires may be connected by a metallic non-magnetic support bar 252 at their lower ends and electrical connection may be made to the support bar 252 to maintain it at a desired potential relative to the beam. As indicated in FIGURE 11, the beam passes between adjacent magnetic grid wires 249 and is deflected downwardly to a greater or lesser extent depending on the strength of the magnetic field between the pair of grid wires 249 through which the beam is momentarily passing. The beam may tend to spread somewhat as the target plates are approached, the proportion of the electrons reaching each plate depending on the signal on the tape 245. It will be apparent that one target plate could be utilized which would receive varying amounts of electrons depending on the magnetic signal on the tape. A single ended output amplifier 255 may receive the signal from the target plates.

Figures 12, 13, 14:
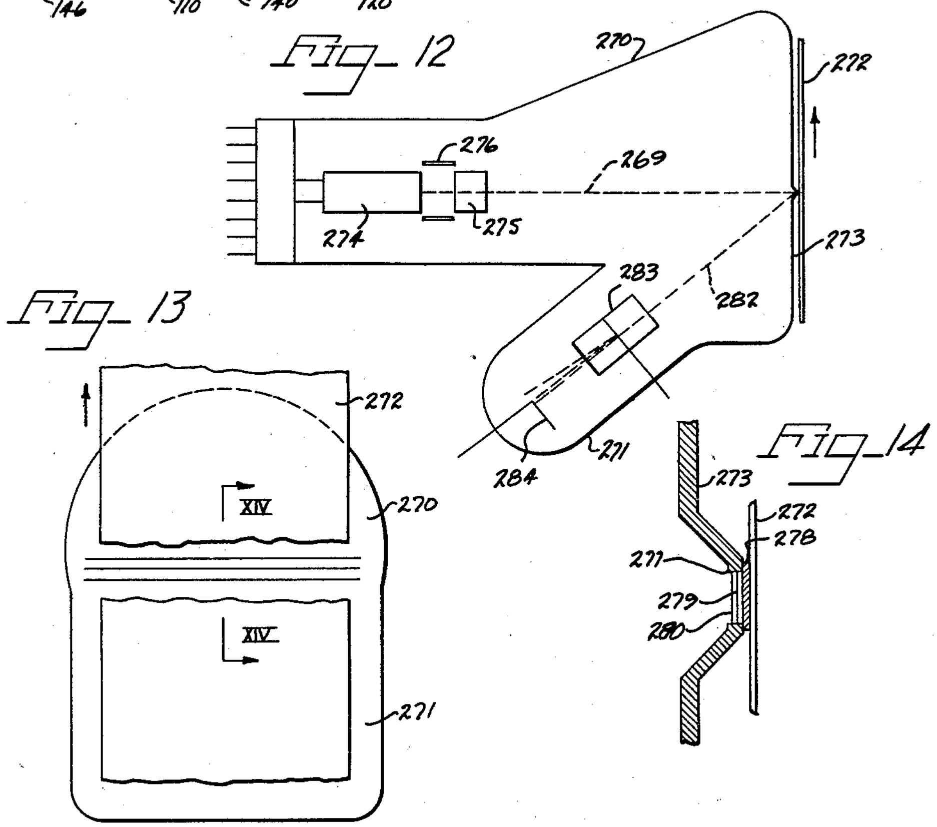
FIGURE 12 is a diagrammatic side elevational view of a still further form of electromagnetic reproducer head embodying the novel teachings and principles of the present invention.
FIGURE 13 is an end elevational view of the reproducer head of FIGURE 12 looking from the right in FIGURE 12 and with a portion of the lengthy magnetizable medium broken away.
FIGURE 14 is a fragmentary enlarged vertical sectional view taken substantially along the lines XIV—XIV in FIGURE 13.

In FIGURES 12, 13 and 14, a further form of electromagnetic reproducer head according to the present invention is illustrated. The head comprises a cathode ray tube 270 having a branch tube 271 for collecting secondary emission electrons. The tape 272 having a magnetizable portion with a video signal recorded thereon is passed across the end of the tube in a manner similar to that in recording. An electron gun 274 supplies a stream of electrons 269 which is swept back and forth across the end wall of the tube by means of horizontal deflectors 275. Vertical adjustment of the beam is afforded by vertical deflectors 276 which may be used to initially adjust the beam vertically to impinge upon a slit or window 277, shown greatly enlarged in FIGURE 14, in the end wall 273 of the tube. Baffle plates and a wide beam may be used to keep the beam accurately on the slit surface, or alternatively automatic control of the deflection voltages may be used. The slit is preferably closed by means of an elongated horizontally extending strip 278 of non-magnetic conductive material, such as beryllium copper having a base layer 279 of silver oxide and a coating 280 of caesium deposited thereon. Since beryllium alone is a good secondary emitter, the other materials are not necessary in all cases. The slit is preferably very narrow in order to give good resolution and the strip 278 very thin.

The reproduction is accomplished by moving the magnetized tape 272 across the exterior surface of the strip 278 so that the magnetic field of successive transverse portions of the magnetized tape extends into the interior of the tube to influence the secondary stream of electrons 282 emitted progressively across the coating 280 of the strip 278 as the scanning beam 269 sweeps across the strip. An accelerating and focusing electrode 283 directs the stream 282 to the video output collector 284, the electrode 283 preferably being shaped to give a linear gradient along the length of the collector 284 corresponding to the gradient established along the length of the strip 278 by the magnetized tape. Video collector 284 may also be made to operate like elements 217 and 218 in FIGURE 6, but on the secondary instead of primary electron stream. Instead of the target 284, an electron multiplier may be provided to give an amplified video output. Thus the unmodulated scanning beam 269 regulates the timing of the horizontal scanning stream 282 and the magnetized tape 272 operates to modulate the stream in accordance with the video signal recorded on the tape. The target plate 284 may operate on a principle analogous to the plates 239 and 240 in FIGURE 9 and a single ended amplifier such as there shown may be utilized to amplify the output from the plate 284.

The present application is a division of my earlier application Serial No. 281,939, filed April 11, 1952, now U.S. Patent No. 2,900,443, issued August 18, 1959.

It will be understood that modifications and variations may be effected without departing from the scope of the novel concepts of the present invention.

I claim as my invention:

1. A magnetic record comprising
(*a*) a magnetic record medium having a series of lines recorded thereon extending generally transversely to the direction in which the record medium is to be moved, the successive recorded lines corresponding to the successive elemental lines of a series of images,
(*b*) each recorded line comprising a series of recorded magnetic fields of successive amplitudes proportional to the respective intensities of the corresponding portions of an elemental line of one of said images,
(*c*) the recorded fields of adjacent recorded lines corresponding to adjacent elements of the image represented thereby being in alignment in said direction in which the record medium is to be moved so that said recorded images on the record medium correspond to said series of images, and
(*d*) the center to center spacing between successive recorded lines associated with a given recorded image being less than about .001 inch with the width of the successive recorded lines being approximately equal to the center to center spacing between successive recorded lines.

2. A magnetic record comprising
(*a*) a magnetic record medium having a series of lines recorded thereon extending generally transversely to the direction in which the record medium is to be moved, the successive recorded lines corresponding to the successive elemental lines of a series of images,
(*b*) each recorded line comprising a series of recorded magnetic fields of successive amplitudes proportional to the respective intensities of the corresponding portions of an elemental line of one of said images,
(*c*) the recorded fields of adjacent recorded lines corresponding to adjacent elements of the image represented thereby being in alignment in said direction in which the record medium is to be moved so that said recorded fields define a succession of recorded images on the record medium corresponding to said series of images, and
(*d*) the center to center spacing between successive recorded lines associated with a given recorded image being less than about .001 inch with the width of the successive recorded lines being approximately equal to the center to center spacing between successive recorded lines,
(*e*) said recorded magnetic fields producing lines of flux at the active surface of the record medium which are directed generally along said recorded lines of magnetization and transversely to said direction in which the record medium is to be moved.

3. A magnetic record comprising
(*a*) a magnetic record medium having a series of lines recorded thereon extending generally transversely to the direction in which the record medium is to be moved, (b) there being a plurality of lines successively transversely offset and in transverse alignment to form a number of columns of lines extending in said direction in which the record medium is to be moved, (c) the number of columns being of the order of three, (d) each line comprising a series of recorded fields of successive amplitudes proportional to the respective intensities of the corresponding portions of an elemental line of an image, and (e) the recorded fields of adjacent lines of each column in said direction in which the record medium is to be moved corresponding to aligned elements of said image which elements are in alignment with respect to the direction at right angles to the elemental lines of said image.

References Cited in the file of this patent

UNITED STATES PATENTS

| | | |
|---|---|---|
| 2,112,527 | Harding | Mar. 29, 1938 |
| 2,245,286 | Marzocchi | June 10, 1941 |
| 2,291,476 | Kernkamp | July 28, 1942 |
| 2,408,293 | Carmel | Sept. 24, 1946 |
| 2,517,808 | Sziklai | Aug. 8, 1950 |
| 2,550,803 | Goddard | May 1, 1951 |
| 2,657,377 | Gray | Oct. 27, 1953 |
| 2,773,120 | Masterson | Dec. 4, 1956 |
| 2,782,043 | Andrews | Feb. 19, 1957 |
| 2,813,924 | Coutant et al. | Nov. 19, 1957 |

FOREIGN PATENTS

| | | |
|---|---|---|
| 600,191 | Germany | July 18, 1934 |